Aug. 24, 1965 C. E. WADE 3,202,284
FILTER APPARATUS AND METHOD
Filed Jan. 14, 1963 2 Sheets-Sheet 1
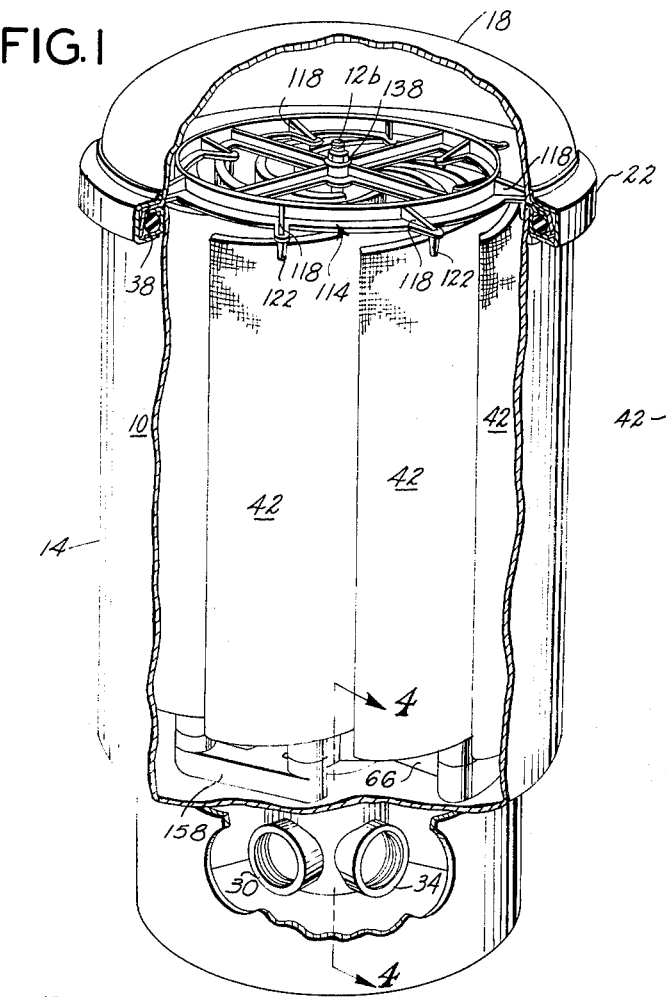
FIG. 1
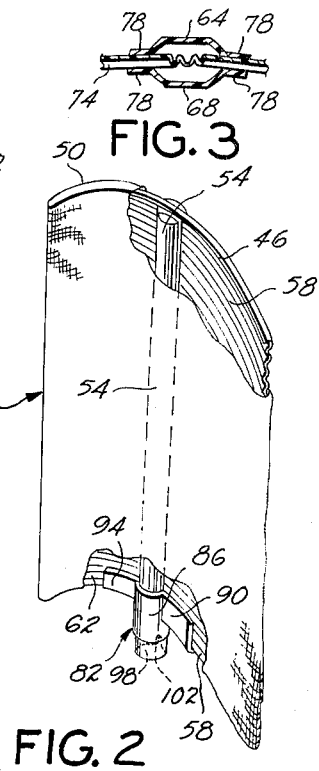
FIG. 3
FIG. 2
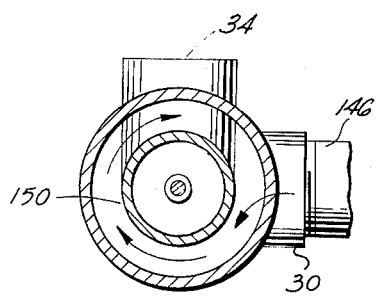
FIG. 5
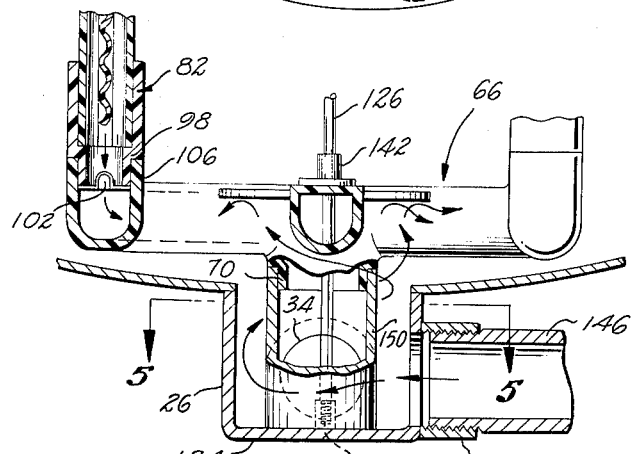
FIG. 4
INVENTOR.
CHARLES E. WADE
BY Boniard␣␣␣Brown
ATTORNEY Aug. 24, 1965  C. E. WADE  3,202,284

FILTER APPARATUS AND METHOD

Filed Jan. 14, 1963  2 Sheets-Sheet 2

INVENTOR.
CHARLES E. WADE
BY
Boniard I. Brown
ATTORNEY

United States Patent Office 3,202,284
Patented Aug. 24, 1965

3,202,284
FILTER APPARATUS AND METHOD
Charles E. Wade, 18238 Gragmont, Covina, Calif.
Filed Jan. 14, 1963, Ser. No. 251,093
13 Claims. (Cl. 210—75)

The present invention relates generally to an improved filter and method for removing foreign matter from liquids; more particularly, the invention relates to such a filter and method intended primarily for use in the treatment of swimming pool waters.

Swimming pool waters tend to constantly entrap or accumulate unwanted foreign matter, because of the nature of their use, their usual location, and their inherent tendency to support the growth of algae and bacteria. Typical examples of such foreign matter are dust, dirt, leaves, and similar trash; oils such as hair oils and suntan lotion; algae; gelatinous materials resulting from the interaction of chemicals of various sorts present in pool waters; and insoluble salt products of chemical reaction between the chlorine normally found in pool water and other reactive materials. For reasons of health, safety and attractiveness of pool appearance, it has long been considered essential to minimize such water pollutants. This is generally accomplished by mechanical filtration.

Filters employed for treating swimming pool waters have been, by and large, either sand filters or filters having filter cloth elements of one sort or another (bags, horizontally or vertically disposed grids with loosely fitting filter cloth covers, etc.), these often being utilized in conjunction with a filter aid, such as diatomaceous earth. In using filters employing a filter aid, which is normally a finely divided material having a powdery appearance, the filter aid is typically added to the pool water upstream of the filter at a position sufficiently close that it is readily transported to the filter elements and is evenly deposited thereon to form a cake on their upstream surfaces. This cake normally has a thickness ranging from about $\frac{1}{32}$ inch to about $\frac{1}{4}$ inch. The cake thus formed provides an efficient "strainer" for dirty pool water, retaining unwanted pollutants or sediment while permitting clarified water to pass through. This is made possible, as is well known to those versed in the art, by the necessarily peculiar physical structure and characteristics of filter aid particles, whereby they are rendered incompressible and hence porous to liquids when in cake form.

Although filters employing filter aids do an excellent job of clarifying swimming pool waters, those heretofore known and used have been characterized by a common shortcoming, the necessity of relatively frequent servicing. This servicing is the removal of the cake from the filter elements, as by backwashing (accomplished by reverse flow of water through the filter to permanently remove the spent filter aid from the system) or "spinning" (temporarily removing the cake by rapidly rotating the filter elements inside the filter casing). Such servicing is necessitated by a relatively rapid buildup of sediment on the filter cake surfaces facing upstream which results in progressively increasing clogging of the filter elements until it becomes necessary, in order to maintain effective filtration, to remove the filter cake and replace it with new filter aid material or with a new cake formed from the same material. In the latter event it will be apparent that the disintegration of the cake and reforming of a new one from the same material results in disruption of the sediment crust and redistribution of the sediment throughout the cake in a manner far less conducive than surface deposition to plugging of the filter elements.

The present invention provides a new type of filter, particularly suited for the clarifying treatment of swimming pool waters, employing filter elements with adhering cakes of filter aid material, which by virtue of its unique design, assembly of parts, and manner of functioning is capable of continued service for unprecedented periods of time before servicing becomes necessary. Moreover, the filter of this invention is so designed and assembled as to permit rapid and ready access to its filter elements for servicing purposes. The filter design is also such as to provide maximum usable filter area in a given volume, thus providing smaller, more compact filters than those of other types having equivalent capacities. Moreover, it is a relatively simple matter to install a new filter, either as a replacement for an older filter or in a new pool system, because its small volume simplifies the problem of access to necessary valves and fittings, an ever present problem in the installation of filters.

It is therefore a principal object of the present invention to provide an improved filter, particularly suitable for use in clarifying swimming pool waters, which is capable of functioning for relatively long periods of time without requiring servicing or cleaning.

An object of the invention is the provision of a filter according to the foregoing object which is easy to disassemble and service.

It is an object of the invention to provide such a filter which is of substantially reduced size by comparison with filters of other types and which is easily installed in either older or newer pool systems.

Other objects, features and advantages of the present invention will become apparent to those versed in the art from a consideration of the following description, the appended claims and the accompanying drawings, wherein:

FIGURE 1 is a perspective view, partially in section, of a filter according to the present invention, showing the arrangement of filter elements and other internal parts;

FIGURE 2 is a perspective view of a fitler element in accordance with the invention with its cloth cover partly cut away to show the configuration of its grid and drain portion structure;

FIGURE 3 is an enlarged fragmentary sectional view of the drain portion of the filter element of FIGURE 2;

FIGURE 4 is an enlarged fragmentary sectional view of the lower portion of the filter, taken at line 4—4 of FIGURE 1, showing the flow paths of water entering and leaving the unit;

FIGURE 5 is a sectional view of the water inlet passageway of the filter unit, taken at line 5—5 of FIGURE 4, showing the direction of flow of the entering water;

Figure 6:
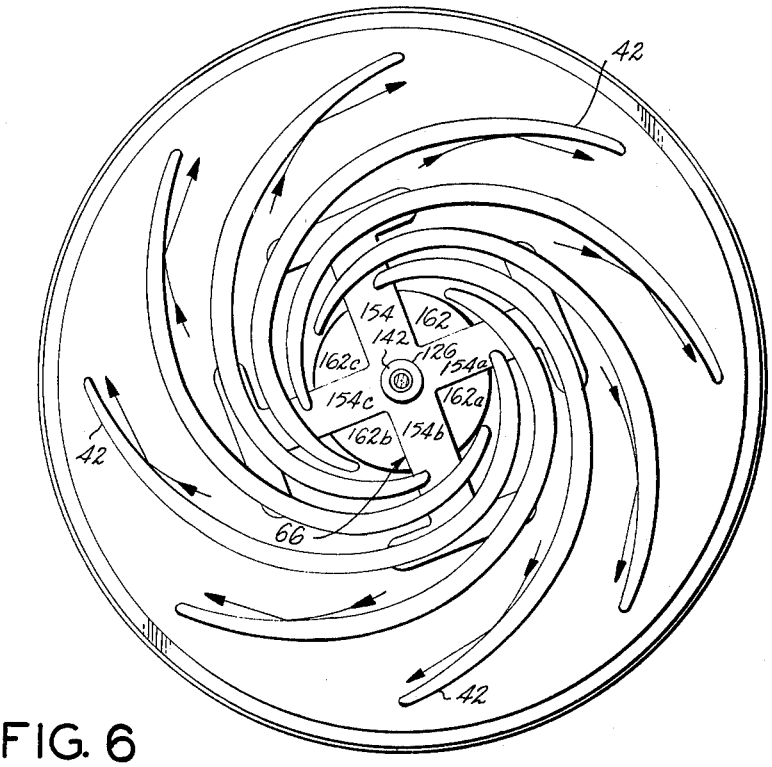
FIGURE 6 is an enlarged top view of the FIGURE 1 filter with the cover and the constant spacing separator removed, showing the filter elements in their operative positions and indicating by directional arrows the swirling flow of the dirty pool water in the unit.

Referring to the drawings, and particularly to FIGURE 1, a preferred embodiment of the filter apparatus of the invention is shown as including a housing 10 consisting of a tank-like cylindrical body section 14, a domed top or cover 18, a sealing closure or clamping ring assembly 22 for holding body section 14 and cover 18 in sealing contact; and a bottom appendage 26 with tapped inlet and outlet ports 30 and 34, respectively, through which the incoming and outgoing liquid streams flow. Clamping ring closure assembly 22 may be of any appropriate type, a preferred arrangement employing, as a sealing element, a resilient O-ring, such as is shown at 38 and having an annular retaining channel therefor fixedly secured to the body section 14 of housing 10 at its upper end around its outer periphery, said channel being shallow enough to permit protrusion therefrom of the outer peripheral edge of the O-ring. Completing the clamping ring closure assembly are a flange-like shoulder extending radially outwardly from the lower rim of filter cover 18 with a skirt depending downwardly from its outer periphery, said shoulder and skirt being so designed as to fit over the aforesaid retaining channel at sufficiently close tolerance to partially compress the O-ring; and a clamping ring of channel or U-shaped cross-section which fits snugly over the O-ring enclosure. The clamping ring preferably consists of two semi-circular sections, each hinged to the other at one extremity so that they can be formed into a ring by fastening their non-hinged ends together with lever-operated toggle-link locking assembly hardware (not shown). As its name implies, the function of the clamping ring is to press the skirt-enclosed channel containing the O-ring into sealing engagement therewith and thus effect the sealing function of closure assembly 22. The clamping ring closure assembly 22 is more fully described in the copending application of Charles E. Wade entitled "Sealing Closure," Serial No. 81,524, filed January 9, 1961 and now abandoned.

Vertically disposed within body portion 14 of housing 10 are a plurality of identical filter elements, each designated by the numeral 42, arrayed in vane-like convolute disposition about a central hollow core, as shown in FIGURE 6. Filter elements 42 are identical in size and shape, each being of involutely curved cross section, as indicated by FIGURE 2 and as clearly shown in FIGURE 6, and consisting of a rigid inner member or grid 46 and an outer cover 50 of suitable filter cloth, preferably fabricated of Dacron or other synthetic fabric.

Grid 46 is preferably made of a substantially corrosion-proof high-impact plastic material such as saran plastic, and it comprises a central drain portion 54 through which the clarified pool water drains into a manifold 66 fitted to outlet port 34 through an elbow-shaped casting in the manner shown in FIGURE 4 at 70, and wing portions 58, 62, extending outwardly from opposite sides of drain portion 54. Wing portions 58 and 62 are imperforate and of corrugated configuration, as shown in FIGURE 3, and they serve the dual purpose of affording structural support for the filter element covers, thereby providing extensive filter surface areas. The corrugations provide means for channeling water passing through the filter cloth covers into the central drain portions 54 of the filter elements. Filter covers 50 are readily prepared in single thickness by folding and sewing the Dacron or equivalent material where necessary to form loose fitting bags or envelopes around grids 46. Wing portions 58, 62 are not separate members in the ordinary sense of the word, but are separate portions of a corrugated vane-like larger member 74, as shown in FIGURES 2 and 3.

Each of central drain portions 54 of elements 42 consists of two channel-like members 64, 68 fixedly secured in concave facing relationship to opposite sides of corrugated member 74 as shown in FIGURES 2 and 3. As illustrated in FIGURE 3, members 64 and 68 both have flange-like extensions, all denoted by the numeral 78, projecting outwardly from each side to form flat strips which fit flush against the ridges of corrugated member 74, when assembled in place in the manner indicated in FIGURE 3. The upper ends of channel-like members 64 and 70 are preferably substantially sealed by closures, as shown in FIGURE 2, and their lower ends are in open communication with a drain fitting 82 having a central cylindrical portion 86 to collect and channel the water flowing downwardly thereunder. Outwardly extending channel-shaped portions 90 and 94 of fitting 82 are in open communication with cylindrical portion 86, and are so configured as to tightly receive corrugated member 74 in the manner shown in FIGURES 2 and 4 and to furnish means for supporting it in upstanding position within filter housing 10. A cylindrical manifold insert portion 98 of fitting 82 is in open communication with and in coaxial relationship with, but of smaller cross section than, central cylindrical portion 86.

There is a notch or slot 102 in the lower rim of manifold insert portion 98 of drain fitting 82, positioned as shown and designed to engage a small boss or protuberance (not shown) on the inner wall of a manifold intake port (such as that shown at 106 on FIGURE 4) into which said insert portion 98 is adapted to fit, thereby seating the lower end of the filter element in proper position to insure correct positional integrity of the element within the filter. The tolerance between manifold insert portion 98 of element 42 and manifold intake port 106 is snug but not so tight as to prohibit ready assembly and disassembly of the filter unit for cleaning and other purposes.

Symmetrically disposed about the central axis of drain portion 54 of each element 42 are corrugations 110 in corrugated member 74 extending perpendicularly to the corrugations in wing portions 58 and 62 of that member. FIGURE 3 clearly shows corrugations 110 and shows that corrugated member 74 does not have uninterrupted transverse corrugations extending across its entire width but has such corrugations only in each wing portion with the space under channel-like members 64 and 68 dividing the wing portions being occupied by corrugations of a perpendicularly opposite character. This is to afford drain channels for the smooth flow of water down central drain portions 54 of the filter elements 42 and into manifold 66. The various parts of grids 46 of the filter elements are preferably held together by friction fit in conjunction with other suitable means such as cement or fusion-induced adhesion.

When fully assembled, filter elements 42 are each vertically disposed within housing 10 with manifold insert portion 98 inserted and properly seated in a mating manifold intake port such as port 106, whereby they are supported in upstanding and symmetrically disposed relationship around the axis of the filter. To serve the twofold purpose of holding elements 42 in place and maintaining uniform spacing therebetween during operation of the filter, a constant spacing separator 114 is utilized in the manner illustrated in FIGURE 1. Separator 114 is preferably fabricated of the same corrosion-proof high-impact plastic as that preferred for grid 46.

Constant spacing separator 114 has a plurality of outwardly extending arms 118 spaced equidistantly about its periphery as shown in FIGURE 1. Each of arms 118 has a finger 122 extending perpendicularly downwardly therefrom near its outer extremity. The arms 118 with depending fingers 122 are so configured and positioned as to afford gentle and evenly spaced support to the upper ends of filter elements 42 when separator 114 is secured in its proper position as shown in FIGURE 1. Separator 114 is itself fastened in place by means of a rod 126, preferably of brass or other corrosion resistant metal or alloy, threaded at each end for engagement with a tapped anchoring member 130 fixedly secured in the center of bottom portion 134 of the filter or with a nut as shown at 138 on FIGURE 1.

The method of fastening separator 114 with rod 126 is evident from FIGURES 1, 4, 5 and 6. More specifically, the rod fits through an opening in the center of manifold 66 (FIGURE 6) and a sleeve-like support element 142 affixed thereto in the manner shown in FIGURE 4, and its lower end screws into anchoring member 130. The upper end of rod 126 passes through a central opening in separator 114 and is secured in place by means of a nut 138.

The number of filter elements 42 can vary within the scope of the invention. It has been found that eight such elements cooperate excellently to achieve the desired results and this is considered to be an optimum number.

An eight-element filter is therefore shown in the drawings.

The operation of the filter is believed to be readily apparent from the drawings. Referring to FIGURES 4 and 5, dirty swimming pool water enters the bottom of the filter through an inlet line 146, threadedly connected to inlet port 30, in the direction indicated by the appropriate arrows. Concentrically disposed within bottom appendage 26 of the filter is an upright portion 150 of an elbow-shaped casting which terminates at its other end in the outlet port 34 as shown. Although the casting with upright portion 150 is generally elbow-shaped as indicated, said upright portion extends downwardly past the bend in the elbow in the manner shown in FIGURE 4, and its bottom end rests on bottom portion 134 of the filter. It will be apparent that this arrangement affords a more stable foundation for the internal filter element structure supported thereby than would a conventionally designed elbow casting. In any event, the design and presence of the casting causes the incoming water to travel upwardly in a generally spiral path therearound in the manner indicated by the curved arrows in FIGURES 4 and 5.

Manifold 66 comprises four horizontal tubular sections 154, 154a, 154b, and 154c projecting outwardly from a central drain at 90 degree angles from each other. Each horizontal tubular section is in open communication with the middle of a horizontal tubular portion disposed perpendicularly thereto, such as that shown at 158 in FIGURE 1. Thus, there are four such tubular portions, one being joined to the outer end of each of tubular sections 154, 154a, 154b and 154c in the manner illustrated in FIGURE 6. These four tubular portions are of like design, each having a manifold inlet port, as shown at 106, at each of its ends. It will be observed from the foregoing discussion and the accompanying drawings that each of these tubular portions supports two of the filter elements 42 in its two manifold inlet ports respectively, making a total of eight filter elements consistent with the previously indicated optimum for the number of such elements.

Partially filling the four quadrants formed by converging tubular sections 154, 154a, 154b and 154c of manifold 66 are horizontal webs 162, 162a, 162b and 162c which are believed to serve the primary purpose of deflecting the incoming pool water from line 146 outwardly from the central area of the filter, thereby causing it to flow upwardly therefrom in an increasingly wider spiral or helical motion. Opinion as to the critical significance of this pattern of flow to the operability of this invention is hereinafter set forth. Manifold 66 is preferably of unitary plastic construction, the preferred plastic being the same as that from which filter grids 46 and separator 114 are fabricated. The fit between manifold 66 and upright portion 150 of the elbow-shaped casting terminating in outlet port 34 is a relatively loose friction fit.

Considering again the movement of water within the filter, the entering pool water in a dirty condition is, as previously noted, first caused to swirl around the elbow-shaped casting disposed within bottom appendage 26 of the filter, and is then deflected by webs 162, 162a, 162b and 162c of manifold 66 so that it flows upwardly therefrom in a widening spiral. The spiral path of the water causes its currents to contact filter elements 42 at an acute angle, in the manner graphically illustrated by the arrows shown approaching the filter elements in FIGURE 6, rather than at relatively steep angles or "head-on," as in the case of conventional water filters. As hereinbefore described, a layer of filter cake adheres to the outer surfaces of the cloth-covered filter elements 42 and is held in place by the pressure drop across the filter cake and filter cloth.

Many conventional filters heretofore known and used have cloth-covered grid filter elements and employ a filter aid in amount sufficient to form cakes on the filter element surfaces of substantially the same thickness as the cakes on the filter elements utilized with the present invention. Although such filters perform satisfactorily while they are kept relatively clean, the problem, as has been previously indicated, is in keeping them clean. Thus, in conventional filters the cake surfaces rapidly become clogged with sediment from the dirty water. The sediment collects on the cake surfaces to form a crust which must frequently be broken up, as by back-washing or "spinning," to expose new porous filter aid material. It is believed that the rapid formation of such a sediment crust on filter aid cakes in conventional filters is attributable to the above-mentioned fact that the water flow is routed directly toward the filter elements, rather than obliquely toward them. Filters designed in accordance with the present invention have been found to require much less frequent servicing to cure clogged filter elements, than has been the case with conventionally known filters utilizing a filter aid. More specifically, it has been discovered that filter units of the invention normally require servicing no more than one-third as often as such conventionally known filters.

Diatomaceous earth is considered to be the preferred filter aid for use in filters according to the invention. However, other materials possessing utility as filter aids, such as vermiculite or perlite, can be employed in the filters if desired.

Although there is no intention to be bound by any theoretical considerations expressed herein, it is nevertheless believed that the filter aid cake in the filter of the invention undergoes constant and automatic redistribution of the filter aid material during operation of the unit, because of the unique spiral-path flow of the water therethrough. More specifically, the filter cake surfaces are believed to be continuously swept clean by the dirt and other filterant particles entering the filter with the dirty pool water. It is believed that this occurs by virtue of the fact that such particles naturally follow the same type of spiral path as the swirling water and hence impact the cake at an acute angle, thus tending to exert a scraping influence on its surface and expose fresh diatoms, or equivalent filter aid particles, and greatly reduce the rate of surface crust formation. The arrows in FIGURE 6 are intended to illustrate this kind of impingement of the dirt or other filterant particles on the filter cake surfaces. In contrast, the direct, rather than spiral, flow of water through conventional filters is not conducive to such filterant action because the filterant particles approach the filter element surfaces directly rather than obliquely in a sweeping or scraping manner.

To aid in a clearer understanding of the advantages achieved by the present invention and the problem alleviated thereby, it is pointed out that in typical swimming pool systems the principal ingredients of the so-called crust which forms on the filter cake surfaces is not composed of dirt or other granular foreign matter, but of gelatinous materials formed from the chemicals added to the pool water for various purposes. These gelatinous materials form flocculants which are filtered from the pool water but which, as a result of their physical characteristics, collect on the filter cake surfaces in somewhat the same manner as falling snowflakes collect on the ground, that is, in overlapping or interlacing fashion with a tendency to seal off the surface underneath. It is primarily this gelatinous layer of material that is first scratched or scraped, if the theory of filter operation hereinbefore outlined is correct, by the impacting dirt and similar filterant particles approaching the filter cake surfaces obliquely during operation of the filter.

Although the foregoing theoretical explanation of the reasons why the new filter of the invention requires markedly less servicing than filters heretofore known, may not be correct, the fact nevertheless remains that filters designed as taught herein are possessed of such low servicing or cleaning needs as to be, in a sense, self cleaning.

This has been clearly determined to be true by observation of a large number of filters installed in actual swimming pool systems.

Figures 7, 8:
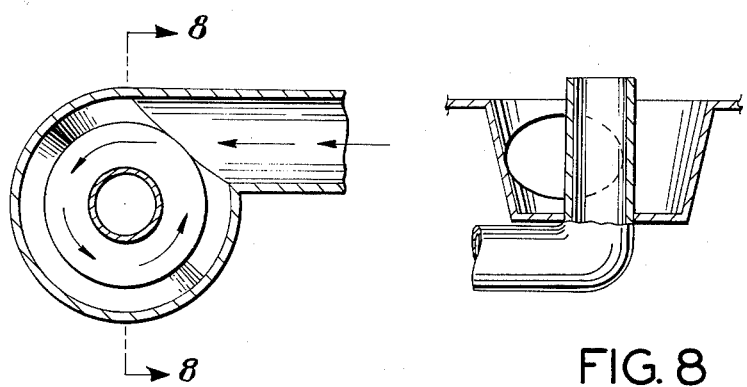
FIGURE 7 is a sectional view of feed inlet means of a type alternative to that shown in FIGURE 5.
FIGURE 8 is a fragmentary sectional view, partly in elevation, of the alternate feed inlet means of FIGURE 7, taken at line 8—8 of FIGURE 7.

FIGURES 7 and 8 illustrate an alternate inlet and outlet flow arrangement for the filter. These figures are considered to be self-explanatory.

Although specific embodiments of the present invention have been illustrated and described herein, it will be understood that the same are merely exemplary of presently preferred embodiments capable of attaining the objects and advantages hereinbefore mentioned, and that the invention is not limited thereto; variations will be readily apparent to those versed in the art, and the invention is entitled to the broadest interpretation within the terms of the appended claims.

The inventor claims:

1. A filtering apparatus for filtering foreign matter from liquids comprising a housing means, means for introducing the liquid to be filtered into an end portion of the housing means, means for imparting an initial circular motion to said liquid within the housing means, filter element means within the housing comprising a plurality of radially extending individual elements having circumferentially spaced outer terminal portions, each of said filter elements having a gradually varying radius of curvature and extending radially outwardly from the axis of the housing, whereby the liquid impinges against the filter element surfaces at an acute angle and to the deflected thereby, and outlet means for cleaned liquid.

2. A filter apparatus according to claim 1, wherein said means for imparting initial circular motion to the liquid comprises inlet means arranged concentrically with said outlet means, and having inlet port means to impart upward and outward motion to the incoming liquid, said filter elements deflecting the liquid toward spiral movement.

3. A filter apparatus according to claim 1, and further including manifold means for collecting filtered liquid from the filter elements and communicating it to said outlet means.

4. A filter apparatus according to claim 3, wherein said means for imparting initial circular motion to said liquid comprises inlet means below the manifold means arranged concentrically with respect to the outlet means and having inlet port means to impart said upward motion to the liquid.

5. A filter apparatus according to claim 4, and further including baffle means positioned above the inlet port to direct the upwardly moving liquid in an outward direction and towards said filter elements.

6. A filter apparatus for filtering foreign matter from liquids comprising a housing means, means for introducing the liquid to be filtered into the bottom of the housing means, means for imparting a circular motion to the incoming liquid comprising an inlet chamber having a tangentially positioned inlet channel, means for imparting outward and upward motion to said incoming liquid, filter element means within the housing for filtering the liquid comprising a plurality of separate filter elements to deflect the upwardly and outwardly moving liquid by impingement against the element surfaces, said filter elements having spaces therebetween to provide discontinuous paths of flow outwardly and circumferentially, and outlet means for the filtered liquid.

7. A filter apparatus according to claim 6, and further including outlet conduit means positioned concentrically relative to said inlet chamber, whereby the incoming liquid is caused to circulate around said outlet means.

8. A filter apparatus according to claim 7, and further including traverse baffle means positioned over said inlet chamber whereby the upwardly moving liquid is deflected to move outwardly in said housing.

9. A filter apparatus according to claim 6, wherein each of said filter elements is provided with an upright drain means for removing the filtered liquid, and further including manifold maens having communication with all of said filter drain means and having communication with said outlet means.

10. A filter apparatus according to claim 9, wherein said inlet chamber is arranged centrally to the housing means and concentrically with respect to said outlet means for imparting said circular motion to the liquid.

11. A method for filtering liquid comprising causing the liquid to be rotated in an inlet portion of a filter chamber, positioning filter elements each having a gradually varying radius of curvature and having a filter cake surface extending radially outwardly, and causing the liquid to move outwardly between adjacent filter elements to impinge on the filter cake surface at an arcuate angle to be deflected thereby in a discontinuous spiral flow of liquid not parallel to filter surfaces.

12. A method according to claim 11, and further including the step of initially imparting radial motion to the incoming liquid and causing it to move radially and axially relative to the filter elements.

13. A method according to claim 12, and further including the step of deflecting the moving liquid outwardly after it has initially been caused to rotate circularly.

References Cited by the Examiner

UNITED STATES PATENTS

| | | | |
|---|---|---|---|
| 420,136 | 1/90 | Willis | 210—323 |
| 1,107,485 | 8/14 | Bowser | 210—304 |
| 1,750,185 | 3/30 | McGeehan et al. | 210—193 |
| 1,825,983 | 10/31 | Sweetland | 210—494 X |
| 1,861,576 | 6/32 | Liddell | 210—494 X |
| 2,013,776 | 9/35 | Wiesman | 210—193 X |
| 2,081,009 | 5/37 | Kelley | 210—304 X |
| 2,301,430 | 11/42 | Malanowski | 210—75 |
| 2,523,793 | 9/50 | Vance | 210—193 |
| 2,554,016 | 5/51 | Czarnecki et al. | 214—443 X |
| 2,654,440 | 10/53 | Robinson | 210—347 |
| 2,725,356 | 11/55 | Lombardi | 210—65 |
| 2,989,185 | 6/61 | Lombardi | 210—65 |
| 3,100,191 | 8/63 | Smith et al. | 210—75 X |

FOREIGN PATENTS

| | | |
|---|---|---|
| 578,549 | 6/59 | Canada. |
| 715,538 | 9/54 | Great Britain. |

REUBEN FRIEDMAN, *Primary Examiner.*

ROBERT E. BURNETT, *Examiner.*